(12) United States Patent
Maetani et al.

(10) Patent No.: US 9,360,638 B2
(45) Date of Patent: Jun. 7, 2016

(54) OPTICAL TRANSMISSION BODY, METHOD FOR MANUFACTURING THE SAME, AND OPTICAL TRANSMISSION MODULE

(75) Inventors: Maraki Maetani, Seika-cho (JP); Yuji Masuda, Seika-cho (JP)

(73) Assignee: Kyocera Corporation, Fushimi-Ku, Kyoto-Shi, Kyoto (JP)

( * ) Notice: Subject to any disclaimer, the term of this patent is extended or adjusted under 35 U.S.C. 154(b) by 339 days.

(21) Appl. No.: 13/819,943

(22) PCT Filed: Aug. 31, 2011

(86) PCT No.: PCT/JP2011/069833
§ 371 (c)(1),
(2), (4) Date: Feb. 28, 2013

(87) PCT Pub. No.: WO2012/029879
PCT Pub. Date: Mar. 8, 2012

(65) Prior Publication Data
US 2013/0188908 A1 Jul. 25, 2013

(30) Foreign Application Priority Data

Aug. 31, 2010 (JP) ................................. 2010-193323
Aug. 31, 2010 (JP) ................................. 2010-193325
Dec. 16, 2010 (JP) ................................. 2010-280174

(51) Int. Cl.
*G02B 6/12* (2006.01)
*G02B 6/42* (2006.01)
*G02B 6/43* (2006.01)

(52) U.S. Cl.
CPC .............. *G02B 6/4214* (2013.01); *G02B 6/12* (2013.01); *G02B 6/12002* (2013.01); *G02B 6/423* (2013.01); *G02B 6/4228* (2013.01); *G02B 6/4245* (2013.01); *G02B 6/43* (2013.01)

(58) Field of Classification Search
None
See application file for complete search history.

(56) References Cited

U.S. PATENT DOCUMENTS

| 5,125,054 | A | 6/1992 | Ackley et al. |
| 5,712,941 | A | 1/1998 | Imoto et al. |
| 6,153,359 | A | 11/2000 | Shimizu et al. |
| 6,236,786 | B1 * | 5/2001 | Aoki et al. ............... 385/50 |

(Continued)

FOREIGN PATENT DOCUMENTS

| JP | 09-159846 A | 6/1997 |
| JP | 2004-294857 A | 10/2004 |

(Continued)

OTHER PUBLICATIONS

Japanese Office Action with English concise explanation, Japanese Patent Application No. 2012-531716, Apr. 23, 2013, 5 pgs.

(Continued)

*Primary Examiner* — Michelle R Connelly
(74) *Attorney, Agent, or Firm* — Volpe and Koenig, P.C.

(57) ABSTRACT

An optical transmission body includes a substrate having a through hole penetrating therethrough in a thickness direction thereof; a cladding member at least a part of which is positioned to be filled in the through hole, and which has an optical waveguide hole which is positioned inside the through hole and penetrates through the cladding member in a thickness direction thereof and a guide hole portion which is positioned away from the optical waveguide hole and is concave in the thickness direction; and a core member disposed inside the optical waveguide hole.

14 Claims, 15 Drawing Sheets

(56) References Cited

U.S. PATENT DOCUMENTS

| | | | |
|---|---|---|---|
| 6,330,377 B1* | 12/2001 | Kosemura | 385/14 |
| 6,804,423 B2 | 10/2004 | Tsukamoto et al. | |
| 7,062,144 B2* | 6/2006 | Hwang et al. | 385/139 |
| 7,203,387 B2* | 4/2007 | Doan | 385/14 |
| 7,239,767 B2* | 7/2007 | Kim et al. | 385/14 |
| 7,263,248 B2* | 8/2007 | Windover | 385/14 |
| 7,349,614 B2* | 3/2008 | Doan | 385/131 |
| 8,165,429 B2* | 4/2012 | Lee et al. | 385/14 |
| 8,249,402 B2 | 8/2012 | Asai et al. | |
| 8,285,087 B2* | 10/2012 | Kim et al. | 385/14 |
| 8,536,512 B2* | 9/2013 | Shiraishi | 250/227.24 |
| 8,915,657 B2* | 12/2014 | Inoue et al. | 385/91 |
| 2002/0051599 A1* | 5/2002 | Tsukamoto et al. | 385/14 |
| 2005/0199013 A1 | 9/2005 | Vandroux et al. | |
| 2006/0018590 A1* | 1/2006 | Murayama | 385/15 |
| 2006/0263003 A1 | 11/2006 | Asai et al. | |
| 2008/0118199 A1 | 5/2008 | Asai et al. | |
| 2009/0304323 A1* | 12/2009 | Matsubara | 385/14 |
| 2010/0172620 A1 | 7/2010 | Nanai | |
| 2010/0178018 A1 | 7/2010 | Augusto | |
| 2010/0276664 A1 | 11/2010 | Hersee | |
| 2010/0322551 A1 | 12/2010 | Budd et al. | |
| 2011/0133061 A1 | 6/2011 | Yu et al. | |
| 2011/0136288 A1 | 6/2011 | Duane et al. | |
| 2013/0279843 A1* | 10/2013 | Matsubara et al. | 385/14 |

FOREIGN PATENT DOCUMENTS

| | | |
|---|---|---|
| JP | 2005-134451 A | 5/2005 |
| JP | 2006-039046 A | 2/2006 |
| JP | 2006-39046 A | 2/2006 |
| JP | 2006-058327 A | 3/2006 |
| JP | 2006-78606 A | 3/2006 |
| JP | 2006-078606 A | 3/2006 |
| JP | 2008-298934 A | 12/2008 |
| JP | 2009-139758 A | 6/2009 |
| JP | 2010-85438 A | 4/2010 |
| JP | 2010-096941 A | 4/2010 |
| JP | 2010-96941 A | 4/2010 |
| JP | 2010-134299 A | 6/2010 |
| WO | 2005052666 A1 | 6/2005 |

OTHER PUBLICATIONS

Japanese Office Action with English concise explanation, Japanese Patent Application No. 2012-531716, Feb. 12, 2014, 6 pgs.

United States Office Action, U.S. Appl. No. 13/819,507, Aug. 6, 2014, 15 pgs.

\* cited by examiner

FIG. 6
(a)
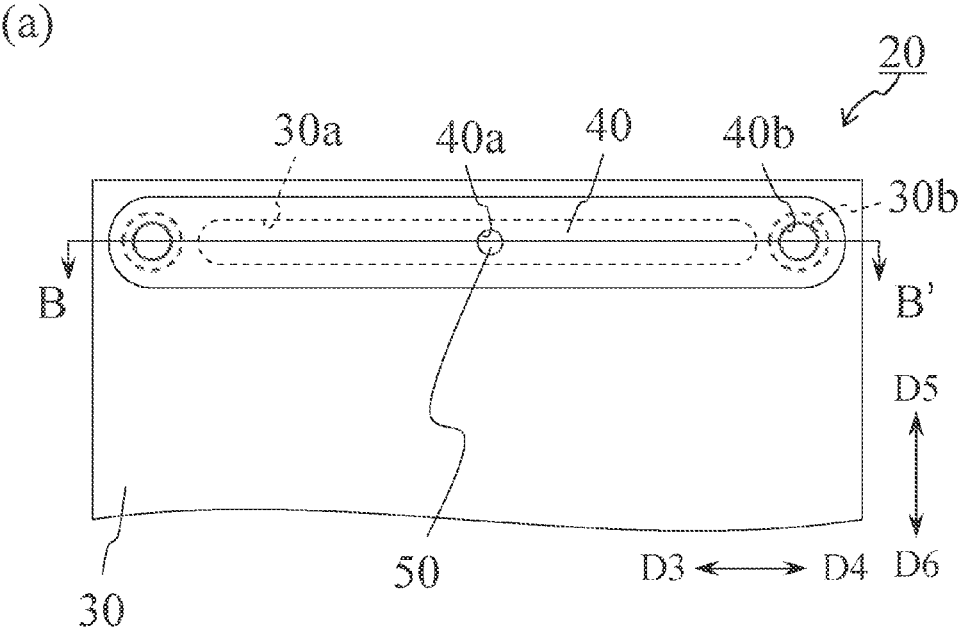
(b)
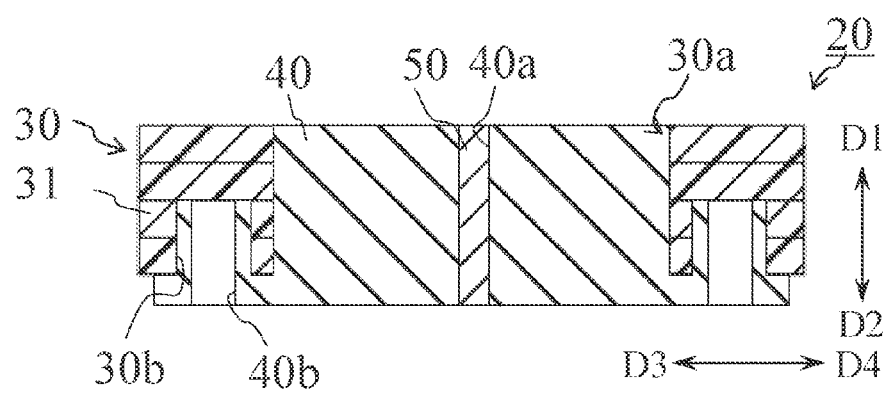
(c)
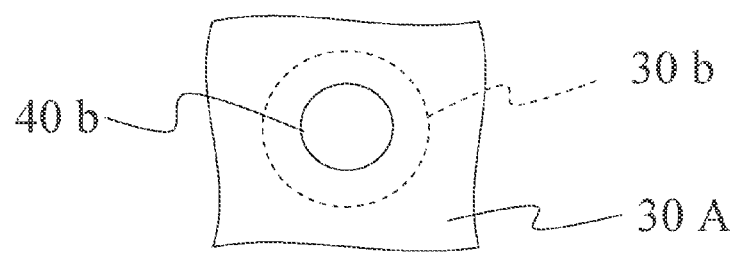

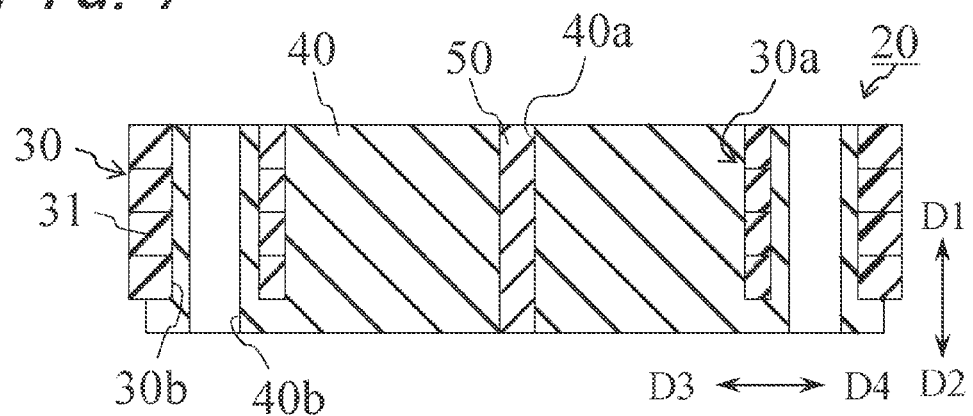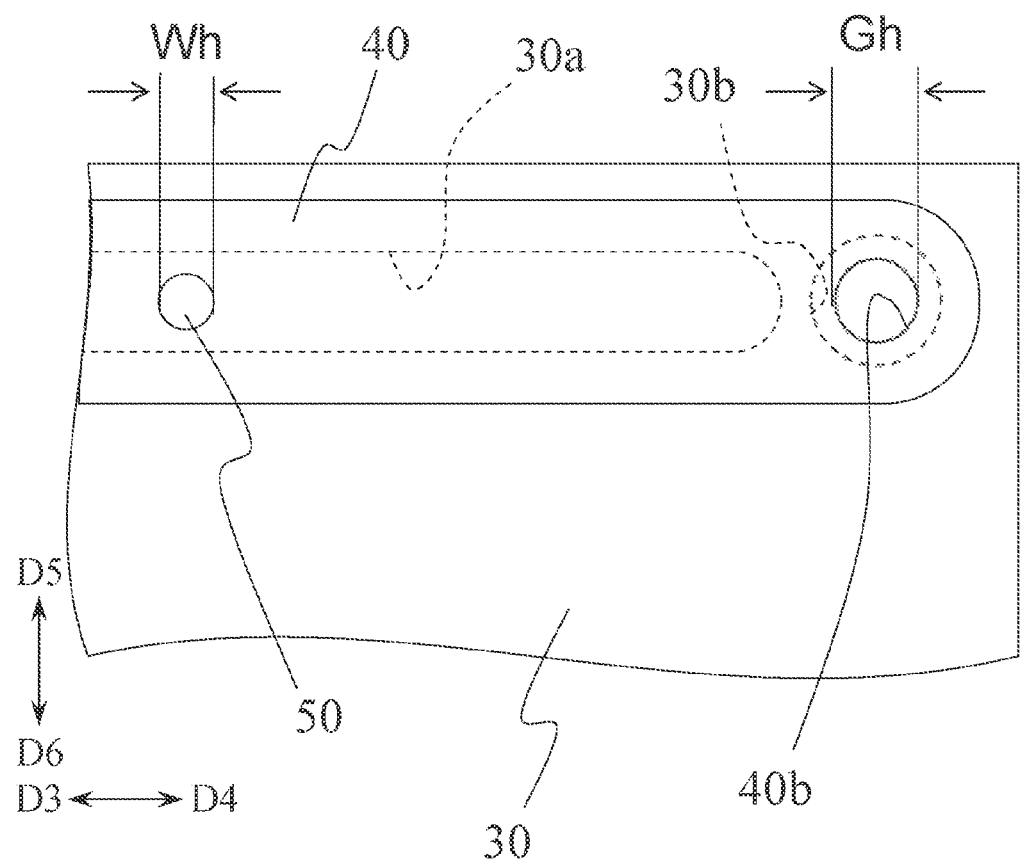

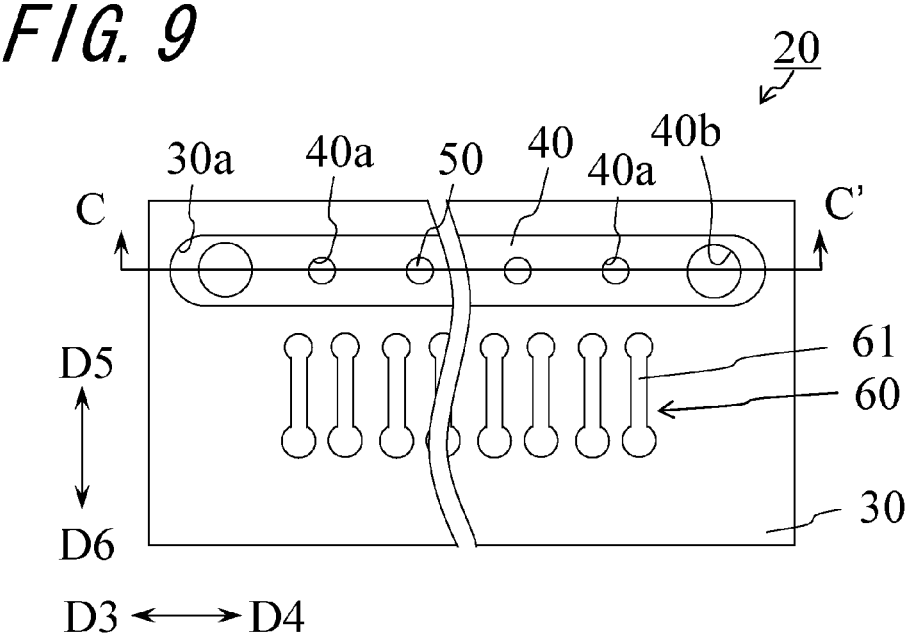

FIG. 10
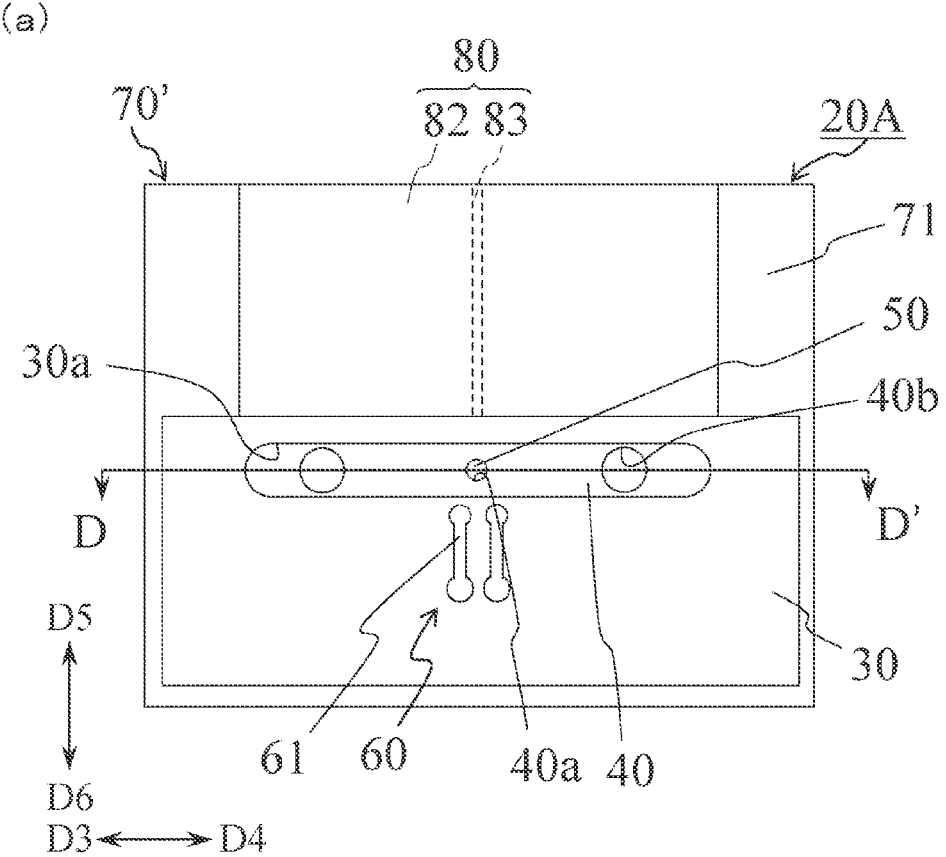
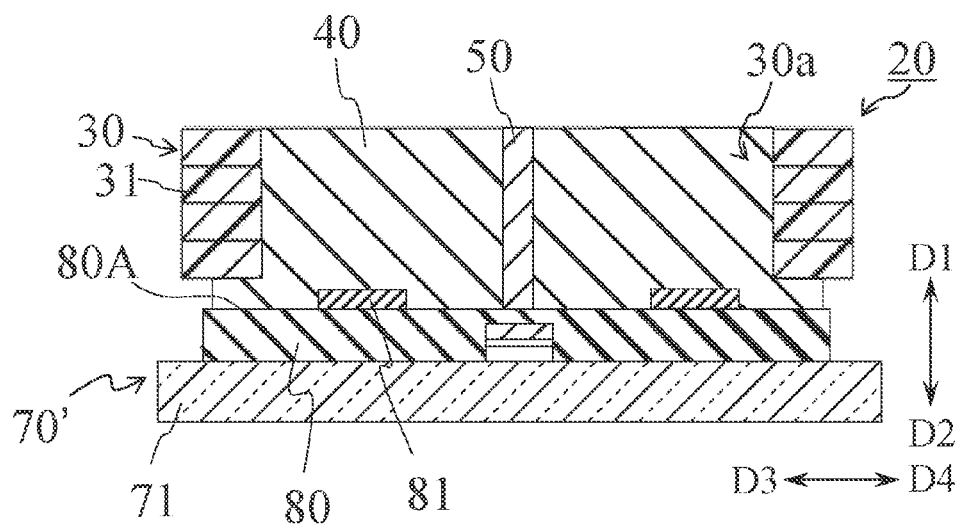

FIG. 11
(a)
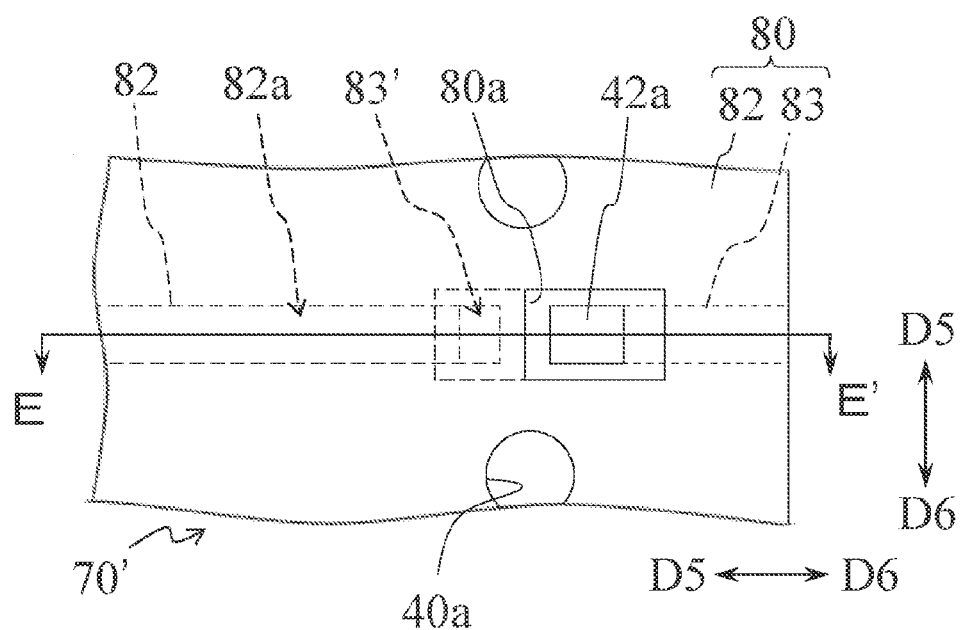
(b)
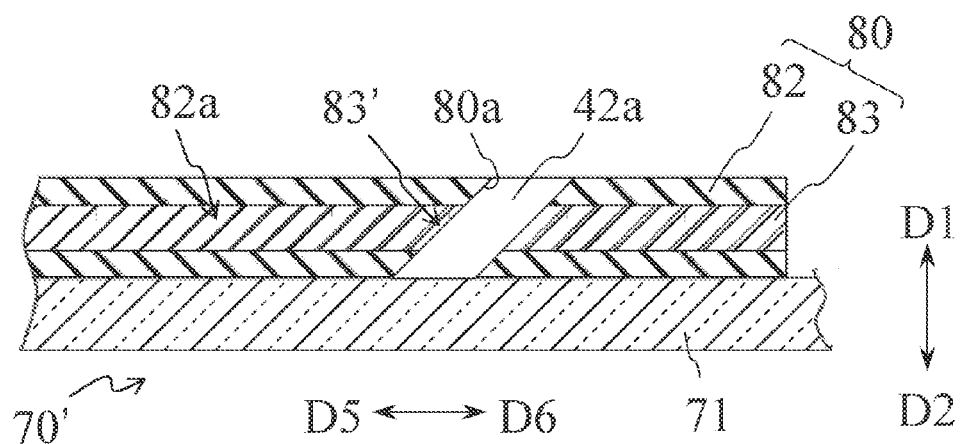

FIG. 13
(a)
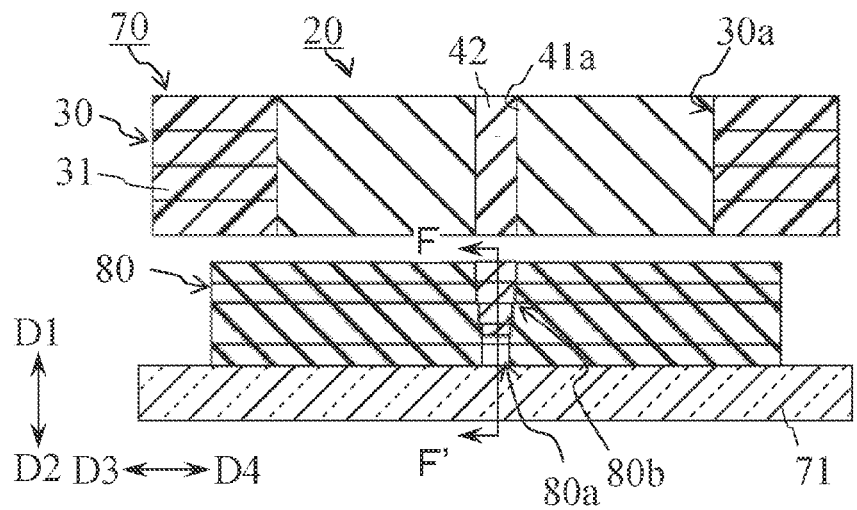
(b)
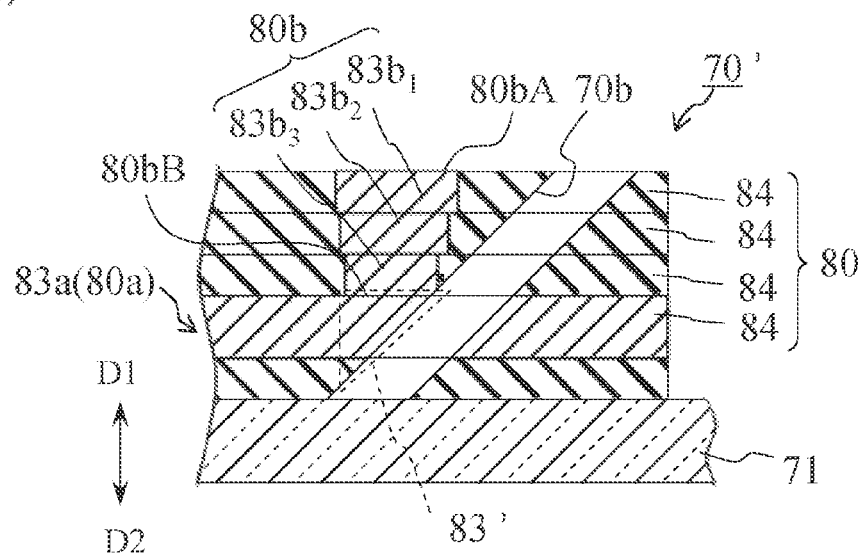
(c)
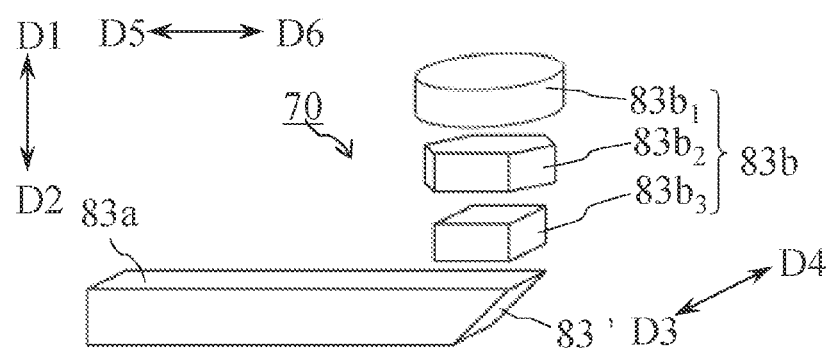

FIG. 15
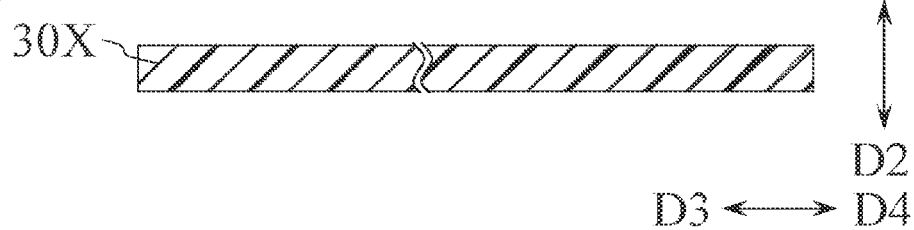
(a)
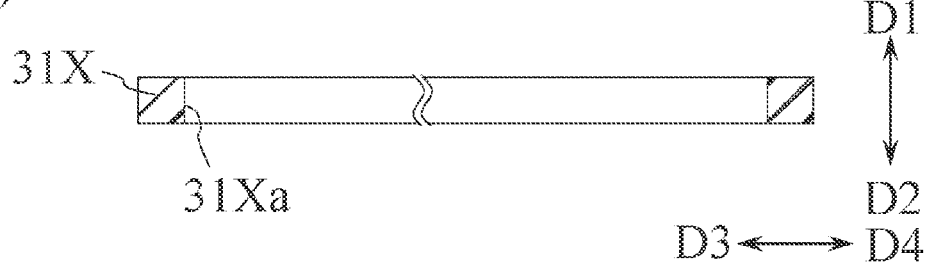
(b)
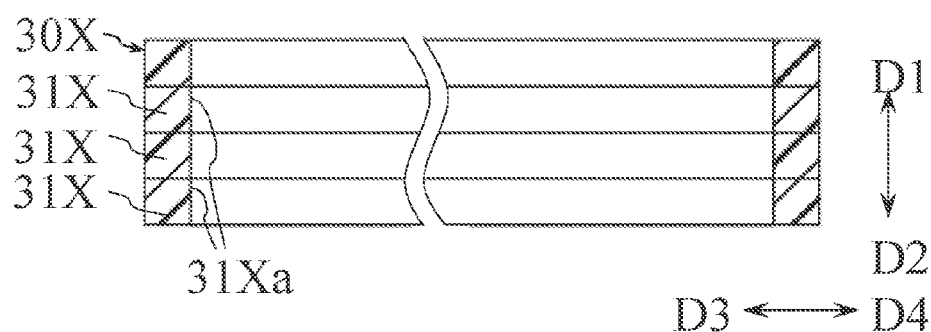
(c)
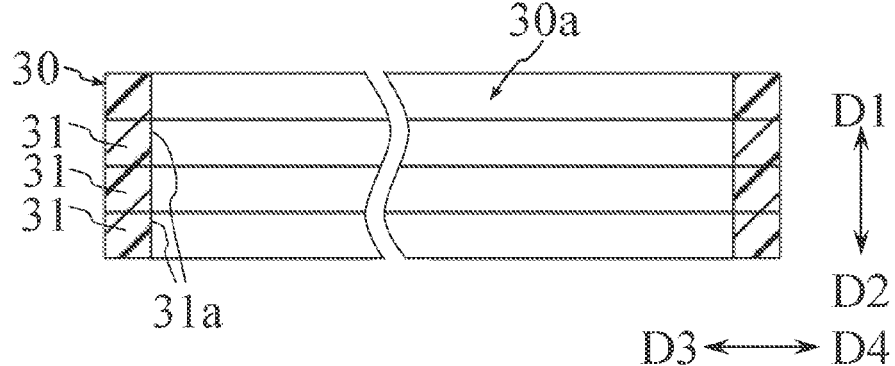
(d)

FIG. 16
(a)
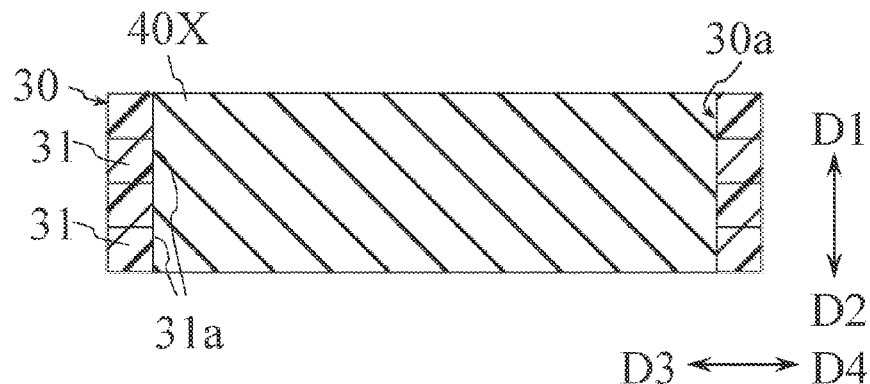
(b)
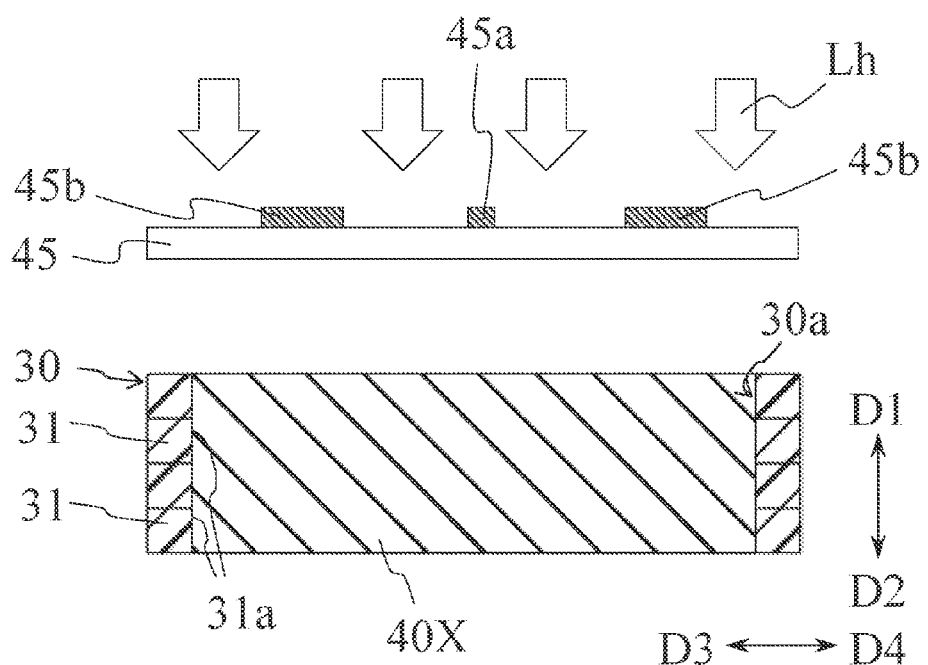

FIG. 17
(a)
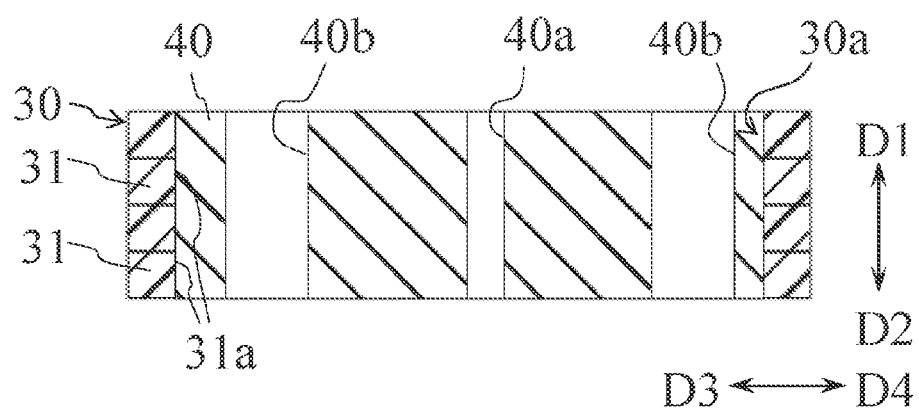
(b)
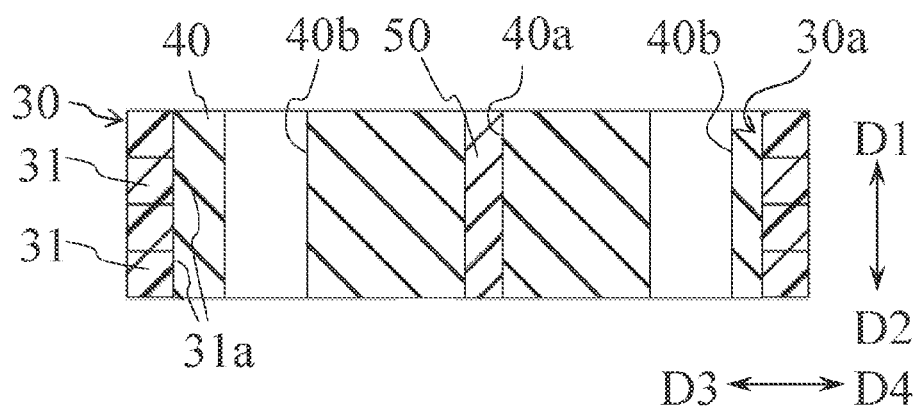

OPTICAL TRANSMISSION BODY, METHOD FOR MANUFACTURING THE SAME, AND OPTICAL TRANSMISSION MODULE

TECHNICAL FIELD

The present invention relates to an optical transmission body, a method for manufacturing an optical transmission body, and an optical transmission module.

BACKGROUND ART

In recent years, in order to improve information processing capability, changing electrical communication between electrical devices, such as integrated circuit devices, into optical transmission has been considered. For example, in Japanese Unexamined Patent Publication JP-A 2004-294857, is disclosed an optical transmission module in which an optical transmission body having an optical waveguide extended in a thickness direction of a substrate is mounted on a base through a guide pin. The optical transmission body is mounted on the base by inserting the guide pin into a guide hole for positioning which penetrates through the substrate in a thickness direction thereof.

However, in the optical transmission body described in JP-A 2004-294857, the guide hole is formed directly in the substrate. Consequently, there is a concern that a problem may occur, such as a positioning error in which the guide hole deviates from a predetermined position or a dimensional error in which the diameter of the guide hole deviates from a predetermined value. As a result, the guide hole formed in the optical transmission body has a constraint on a position or a diameter thereof.

SUMMARY OF INVENTION

An object of the invention is to provide an optical transmission body in which a guide hole has a high degree of freedom in design, a method for manufacturing an optical transmission body and an optical transmission module.

An optical transmission body according to an embodiment of the invention includes a substrate having a through hole penetrating therethrough in a thickness direction thereof, a cladding member at least a part of which is positioned to be filled in the through hole and which has an optical waveguide hole which is positioned inside the through hole and penetrates through the cladding member in a thickness direction thereof and a guide hole portion which is positioned away from the optical waveguide hole and is concave in the thickness direction, and a core member disposed inside the optical waveguide hole.

The optical transmission module according to an embodiment of the invention includes the optical transmission body mentioned above and an optical transmission module base on which the optical transmission body is mounted and which has a fitting portion fitted with the guide hole portion.

A method of manufacturing an optical transmission body according to an embodiment of the invention includes the steps of: preparing a substrate having a through hole penetrating therethrough in a thickness direction thereof; filling an inside of the through hole with a photosensitive material; changing the photosensitive material into a cladding member having an unexposed portion corresponding to a first shielding portion and a second shielding portion, by exposing parts other than an area in which the first shielding portion and the second shielding portion overlap each other out of the photosensitive filling material, to light through a light-transmitting plate having the first shielding portion overlapping the through hole and the second shielding portion positioned away from the first shielding portion; forming in the cladding member an optical waveguide hole penetrating in the thickness direction in correspondence with the first shielding portion and a guide hole portion concave in the thickness direction in correspondence with the second shielding portion by eliminating the photosensitive material on an unexposed portion; and filling an inside of the optical waveguide hole with a light-transmitting core member having a higher refractive index than a refractive index of the cladding member.

ADVANTAGEOUS EFFECTS OF INVENTION

According to the invention, an optical transmission body and an optical transmission module are provided which have a high degree of freedom in design.

BRIEF DESCRIPTION OF DRAWINGS

FIG. 6 is a view showing a modified example of the optical transmission body shown in FIG. 3, FIG. 6(*a*) is a plan view as seen from below a substrate, FIG. 6(*b*) is a cross-sectional view taken along the line B-B' in FIG. 6(*a*), and FIG. 6(*c*) is a plan view in which a part of a guide hole portion and a periphery thereof in FIG. 6(*a*) are enlarged, respectively;

FIG. 7 is a cross-sectional view showing a modified example of an embodiment of the optical transmission body shown in FIG. 3, which corresponds to a cross section taken along the line A-A' shown in FIG. 3;

FIG. 8 is a view showing a modified example of the optical transmission body shown in FIG. 3, which is an enlarged plan view of a part of the substrate as seen from below;

FIG. 9 is a view showing a modified example of the optical transmission body shown in FIG. 3, which is a plan view of the substrate as seen from above;

FIG. 10 is a view showing a schematic configuration of an optical transmission module of an embodiment according to the invention, FIG. 10(*a*) is a plan view of a substrate and an optical transmission module base as seen from above, and FIG. 10(*b*) is a cross-sectional view taken along line the D-D' in (a);

FIG. 11 is a view showing the optical transmission module base of the optical transmission module shown in FIG. 10, FIG. 11(*a*) is a plan view of a part of the optical transmission module base as seen from above, and FIG. 11(*b*) is a cross-sectional view taken along the line E-E' in (a);

FIG. 13 is a view showing a modified example of the optical transmission module shown in FIG. 10, FIG. 13(*a*) is a cross-sectional view taken along the line D-D' in FIG. 10(a), FIG. 13(b) is a cross-sectional view when the optical transmission module base is taken along the line F-F' in FIG. 13(a), and FIG. 13(c) is a perspective view in which only a second core member of an optical waveguide layer is extracted;

FIG. 15 is a view showing processes of manufacturing the optical transmission body shown in FIG. 3, which corresponds to a cross section taken along the line A-A' in FIG. 3;

FIG. 16 is a cross-sectional view showing subsequent processes following the processes of manufacturing the optical transmission body shown in FIG. 15; and FIG. 17 is a cross-sectional view showing subsequent processes following the processes of manufacturing the optical transmission body shown in FIG. 16.

DESCRIPTION OF EMBODIMENTS

<Embodiments of Optical Transmission Body and Optical Transmission Module>

Hereinafter, as embodiments of an optical transmission body and an optical transmission module according to the invention, an optical transmission body 20 and an optical transmission device 10 are presented and described with reference to the appended drawings.

(Optical Transmission Body)

Figure 1:
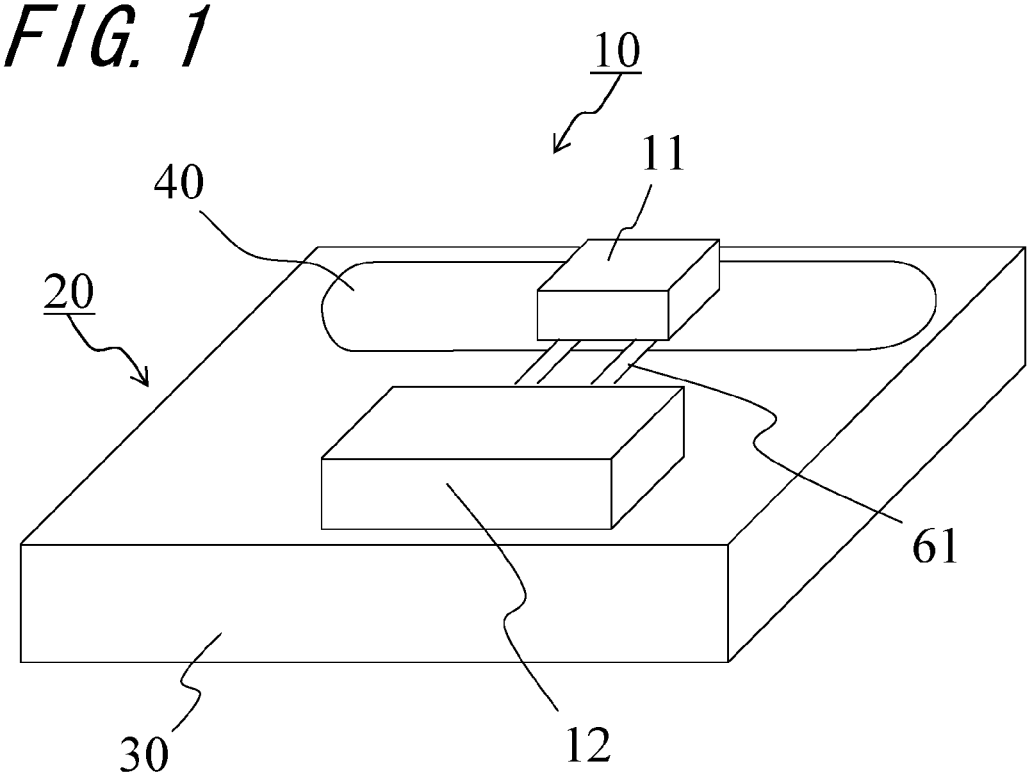
FIG. 1 is a perspective view partially showing a schematic configuration of an optical transmission body according to an embodiment of the invention.
Figure 2:
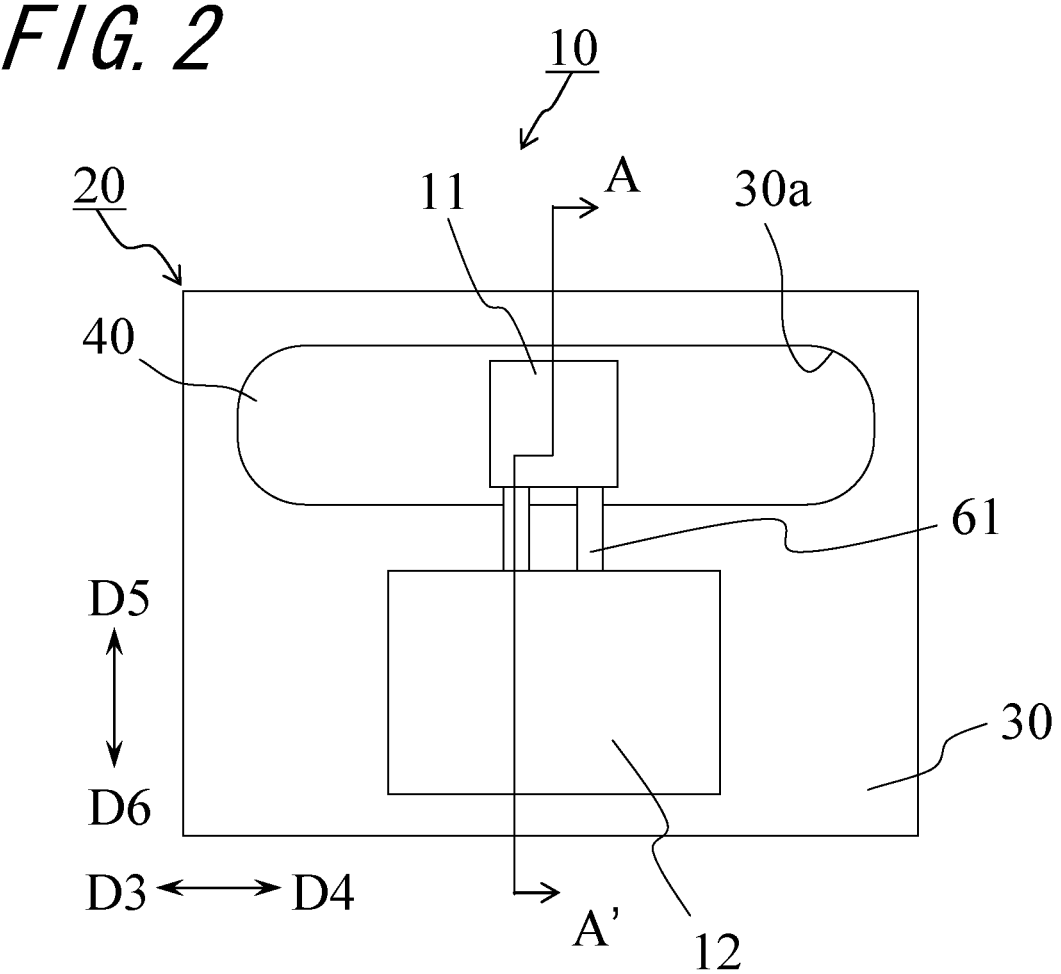
FIG. 2 is a plan view showing a schematic configuration of the optical transmission body shown in FIG. 1.
Figure 3:
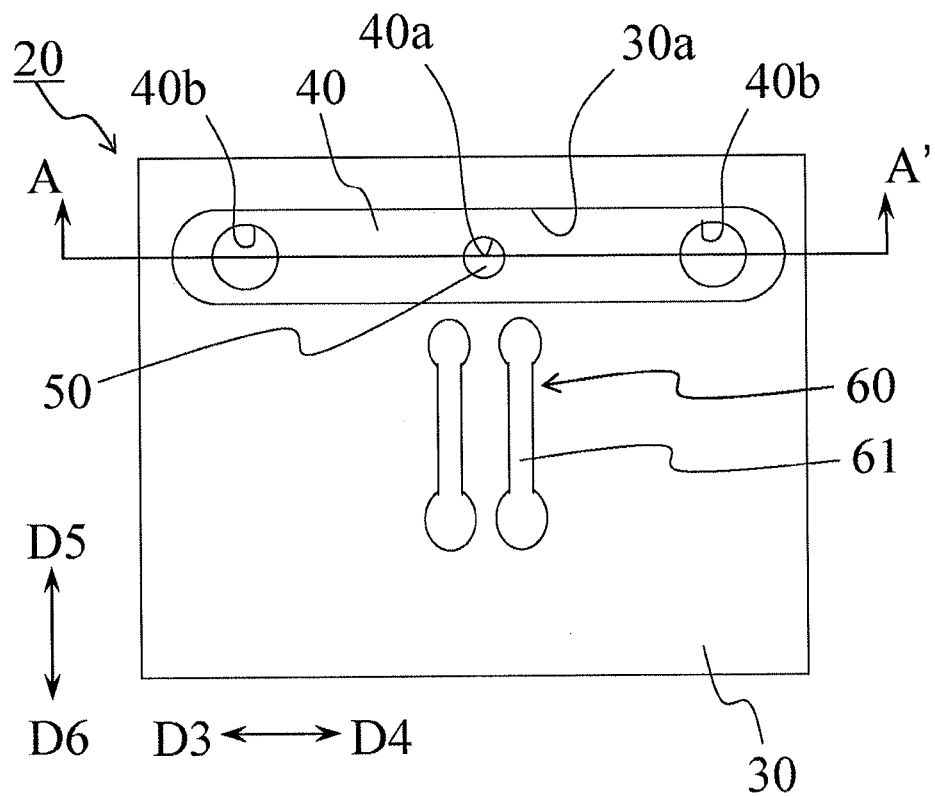
FIG. 3 is a plan view showing a schematic configuration of an embodiment of an optical transmission body constituting the optical transmission body shown in FIG. 1.

The optical transmission device 10 shown in FIGS. 1 and 2 includes the optical transmission body 20, an optoelectronic conversion device 11 used as an optical device and a circuit component 12. The optical transmission body 20 shown in FIGS. 3 and 4 includes a substrate 30, a cladding member 40, a core member 50 and an electric wiring 60.

The substrate 30 has a function of supporting the cladding member 40, the core member 50 and the electric wiring 60. The thickness of the substrate may be, for example, in the range of 0.1 mm or more and 2 mm or less. Examples of the substrate 30 include, for example, an epoxy resin substrate made of a glass base, a copper-cladding substrate made of a glass base, a polyimide resin substrate and a ceramic substrate. The substrate 30 is configured by a single substrate or a laminated body of a plurality of substrates. In the present embodiment, a multilayer ceramic substrate is employed. The substrate 30 in the present embodiment is configured by a laminated body of a plurality of sub-substrates 31.

Figure 4:
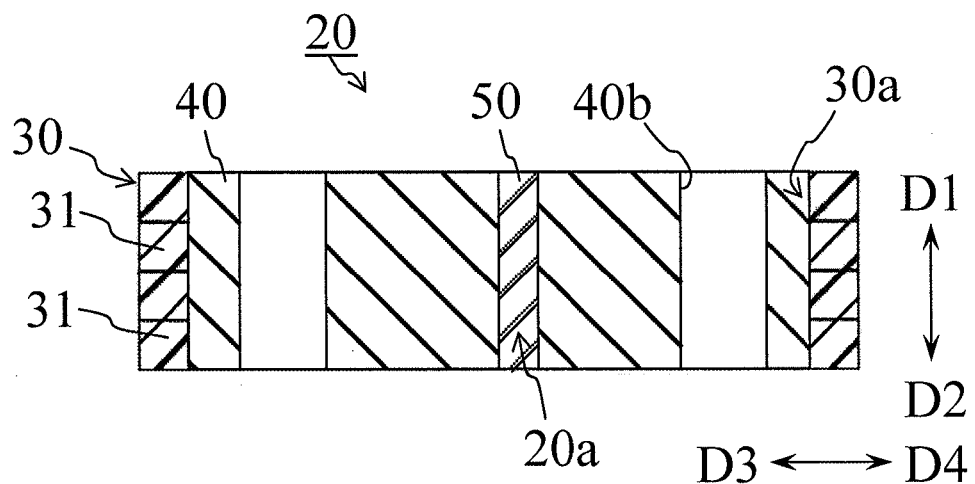
FIG. 4 is a cross-sectional view taken along the line A-A' shown in FIG. 3.

As shown in FIG. 4, the substrate 30 has a through hole 30a penetrating therethrough in a thickness direction thereof. The through hole 30a is formed by arranging sub-through holes 31a provided in the sub-substrates 31. Each sub-through hole 31a is provided in each sub-substrate 31 to penetrate through the sub-substrate 31 in a thickness direction thereof. The thickness direction is denoted by directions D1 and D2 in FIG. 4. A cladding member 40 is provided inside the through hole 30a to be filled in the through hole 30a. In addition, at least a part of the cladding member 40 may be disposed to be filled in the through hole 30a.

The cladding member 40 has a plurality of through holes penetrating therethrough in a thickness direction thereof. Among the plurality of through holes, a through hole in which a core member 50 is provided is an optical waveguide hole 40a and a through hole for the mount to an optical transmission module base 70' is a guide hole portion 40b, respectively. Here, the guide hole portion 40b is positioned away from the optical waveguide hole 40a. The guide hole portion 40b may be concave in the thickness direction, but the guide hole portion 40b does not necessarily have to penetrate through the cladding member 40.

One or more of the guide hole portion 40b may be provided in the cladding member 40. If two or more of the guide hole portions 40b are provided, when the optical transmission body 20 is mounted, the guide hole portions 40b may be position-aligned in the two-dimensional direction (a D3-D4 direction and a D5-D6 direction), thereby improving mounting accuracy of the optical transmission body 20. In the present embodiment, it is described the case where two guide hole portions 40b are provided in the cladding member 40. Two or more guide hole portions 40b may be positioned away from each other with respect to a plane perpendicular to the thickness direction.

The optical waveguide hole 40a and the guide hole portions 40b are arranged along one direction perpendicular to the thickness direction. The one direction is referred to as a first direction in the present embodiment. The first direction is denoted by the D3-D4 direction in FIGS. 2 to 4. In addition, the first direction extends in a planar direction of the substrate 30. The diameter of the optical waveguide hole 40a is set to be in the range of, for example, 10 μm or more and 100 μm or less. A diameter of the guide hole portion 40b is set to be in the range of, for example, 30 μm or more and 2 mm or less.

The shape of the optical waveguide hole 40a and the guide hole portions 40b may be properly selected. As the shape of the optical waveguide hole 40a, for example, the same shape as that of a second core member 83 of the optical waveguide layer 80 may be used. In this case, it is possible to lower a combination loss of light. As the shape of the guide hole portions 40b as seen in a plan view, for example, a polygon shape such as a square shape and a circle shape may be used. In the case where the polygon shape may be used as the shape of the guide hole portions 40b, it is possible to align both of the guide hole portions 40b with an angle of the polygon shape and mount the guide hole portions 40b with good accuracy.

The core member 50 is provided inside the optical waveguide hole 40a. The core member 50 is designed to fill an inside of the optical waveguide hole 40a. The diameter of the core member 50 may be in the range of, for example, 5 μm or more and 100 μm or less. The core member 50 functions as the optical waveguide 20a of the optical transmission body 20. The refractive index of the core member 50 is larger as compared to the refractive index of the cladding member 40.

In this way, since the refractive index of the core member 50 is larger as compared to the refractive index of the cladding member 40, the core member 50 may function as the optical waveguide 20a. That is, the cladding member 40 functions as so-called a clad of the optical waveguide 20a, and the core member 50 functions as a core of the optical waveguide 20a. The refractive index of the core member 50 is configured such that the ratio of the refractive index of the core member 50 to that of the cladding member 40 is in the range of, for example, 0.8% or more and 0.4% or less.

A variety of kinds of resins may be used as a material which forms the cladding member 40 including an epoxy resin, an acrylic resin and a polyimide resin. In the present embodiment, a resin having photosensitivity is employed as the material which forms the cladding member 40. With such a resin having photosensitivity, it is possible to form the optical waveguide hole 40a and the guide hole portions 40b using a photolithography technology.

In the optical transmission body 20 of the present embodiment, providing the guide hole portion 40a in the cladding member 40 made of a resin or the like allows the cladding member 40 to have better workability than that of the substrate, thus the problems with lack of location accuracy and dimensional error rarely happen. Therefore, it is possible to raise the degree of freedom in design of the optical transmission body 20.

Also, in the case where the optical waveguide hole 40a and the guide hole portions 40b are made using a photolithography technology, the optical transmission body 20 of the present embodiment has advantages as follows.

The first advantage is that it is possible to significantly lower the relative position deviation between the optical waveguide hole 40a and the guide hole portions 40b. It is resulted from that the optical waveguide hole 40a and the guide hole portions 40b can be formed simultaneously by being exposed at one time. If the position deviation of the optical waveguide hole 40a and the guide hole portions 40b become small, it is possible to mount the optical waveguide hole 40a and the guide hole portions 40b to another optical waveguide (for example, such as an optical transmission module base) located outside than the optical transmission body 20 with high position accuracy. As a result, when the optical transmission body 20 is optically connected to the optical waveguide, it is possible to transmit light propagating inside the optical waveguide hole 40a to the another optical waveguide.

In addition, when a photolithography technology is used, the method depends on the position deviation of a mask part in a photomask corresponding to the optical waveguide hole 40a and the guide hole portions 40b. The manufacturing error of the photomask may generally be less than 1 μm, so that it is possible to easily suppress the position deviation of the optical waveguide hole 40a and the guide hole portions 40b to the diameter of the optical waveguide hole 40a (the core member 50) or less. It is resulted from that if the position deviation of the optical waveguide hole 40a and the guide hole portions 40b is greater than or equal to the diameter of the optical waveguide hole 40a (the core member 50), connection loss with another optical waveguide becomes large.

The second advantage is that it is possible to make the inner wall of the optical waveguide hole 40a smooth. This is resulted from that the optical waveguide hole 40a is made using light having high directivity. By making the inner wall of the optical waveguide hole 40a smooth, it is possible to reduce the loss of the light propagating inside the optical waveguide hole 40a. To those skilled in the art, it is regarded as preferable to make the roughness of the inner wall surface of the optical waveguide hole 40a small enough with respect to the wavelength of the light propagating inside.

The third advantage is to make the distance between the optical waveguide hole 40a and the guide hole portions 40b small. In the past, since the guide hole portion is provided in a substrate, it was difficult to make the distance between the optical waveguide hole 40a and the guide hole portion 40b small from a view point of the strength of the substrate and a view point of a cutting method. In contrast, in the optical transmission substrate 20 of the present embodiment, the guide hole portions 40b is formed in the cladding member 40 using a photolithography technology, thus it is possible to make the distance between the optical waveguide hole 40a and the guide hole portions 40b small. This makes an influence due to bending of the substrate or the like small. Also, this makes it possible to mount the optical transmission module 70 of the optical transmission body 20 with good accuracy. Therefore, it is possible to reduce a connection loss between the core member 50 provided inside the optical waveguide hole 40a and a second core member 83.

The electric wiring 60 is electrically connected to the optoelectronic conversion device 11 which is optically combined with the core member 50. The electric wiring 60 includes a surface wiring layer 61 which is provided in the surface on the D1 direction side of the substrate 30. The electric wiring 60 may include a through conductor penetrating through the sub-substrates 31 and an intermediate wire layer disposed between two sub-substrates 31. It does not matter whether the through conductor has a shape in which the center thereof is hollow or a configuration in which the center thereof is filled with a conducting paste. The through conductor may be formed using methods such as plating, vapor deposition of a metal film, and injection of a conductive resin.

As described above, the electric wiring 60 makes, at its surface wiring layer 61, electrical connection with the optoelectronic conversion device 11. The optoelectronic conversion device 11 of the present embodiment is mounted on the surface wiring layer 61 of the electric wiring 60 by using a metal bump, an electrically conductive adhesive, or the like. Regions other than the juncture of the optoelectronic conversion device 11 and the surface wiring layer 61 may be covered with a protective layer.

The optoelectronic conversion device 11 has the function of emitting light in response to inputted electric signals, or the function of effecting conversion into electric signals in response to incident light. The optoelectronic conversion device 11 is optically coupled to the optical waveguide 20a. The optoelectronic conversion device 11 of the present embodiment performs the function of transmitting optical signals to the optical waveguide 20a in response to electric signals inputted thereto through the electric wiring 60, or the function of transmitting electric signals to the electric wiring 60 in response to optical signals inputted thereto through the optical waveguide 20a.

As the optoelectronic conversion device 11 for emitting light as described above, a variety of light-emitting devices are applicable. For example, a vertical cavity surface emitting laser (VCSEL) can be used for the optoelectronic conversion device 11. As the optoelectronic conversion device 11 for receiving light, a variety of light-receiving devices, such as a photo diode (PD), are applicable. In the case of employing a PD as such a light-receiving device, it is desirable to use a fast-responsive device, for example, a PIN-PD.

The optoelectronic conversion device 11 may have one optoelectronic converting portion for each one, or may have a plurality of optoelectronic converting portions for each one. The optoelectronic conversion device 11 of the present embodiment has one optoelectronic converting portion for each one. One optoelectronic converting portion is disposed corresponding to one core member 50. In one optoelectronic converting portion, a light receiving and emitting surface may be disposed in correspondence with one optical waveguide 20a.

A circuit component 12 is electrically connected with the optoelectronic conversion device 11 through the electric wiring 60. The circuit component 12 has a different function depending on the function that the optoelectronic conversion device 11 has. When the optoelectronic conversion device 11 emits light, the circuit component 12 inputs a modulated electrical signal (a modulated voltage) to the optoelectronic conversion device 11 and controls emission intensity of the optoelectronic conversion device 11. Also, when the optoelectronic conversion device 11 receives light, the circuit component 12 converts a current signal to be outputted into a voltage signal based on the intensity of the light signal received by the optoelectronic conversion device 11 and outputs the converted signal.

The circuit component 12 may have the capability to control signal waveforms or the capability to remove noise components. In a case where electric-signal output from the optoelectronic conversion device 11 is small, it is advisable to impart signal amplification capability to the circuit component 12. This signal amplification capability may be possessed by the optoelectronic conversion device 11 in itself. Moreover, the circuit component 12 may also have the capability to perform logic operations and mathematical calculations.

(Modified Example 1 of Optical Transmission Body)

Figure 5:
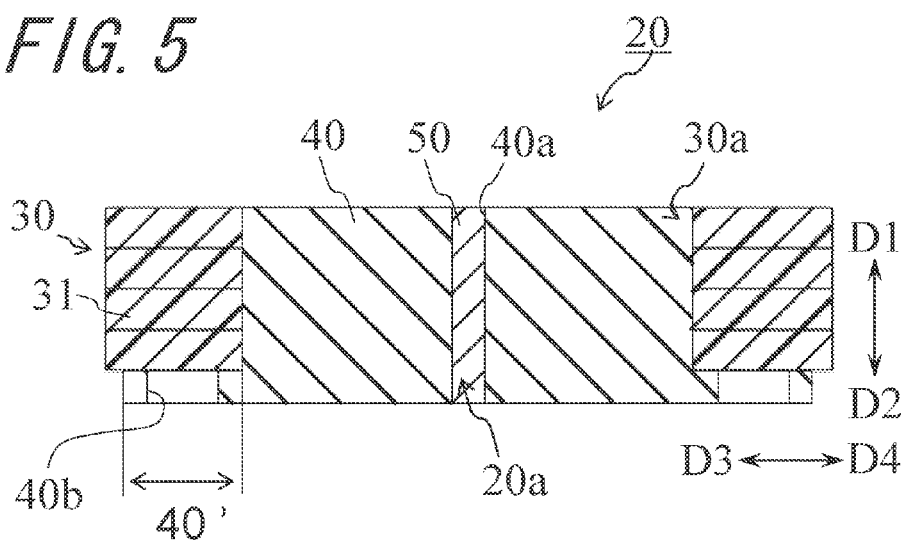
FIG. 5 is a cross-sectional view showing a modified example of the optical transmission body shown in FIG. 3, which corresponds to a cross section taken along the line A-A' shown in FIG. 3.

As shown in FIG. 5, the cladding member 40 has a substrate area 40' which extends across the surface of the substrate 30 from the through hole 30a to overlap the substrate 30. Also, the guide hole portions 40b may be positioned in the substrate area 40'.

The cladding member 40 in the substrate area 40' may be set to have a thickness of, for example, 0.1 μm or more and 300 μm or less from the surface of the substrate 30. The substrate area 40' may be set to have an area of, for example, 1 μm² or more and 5 mm² or less. The guide hole portion 40b is provided in the substrate area 40'. The guide hole portion 40b may penetrate or may not penetrate through the cladding member 40 in the substrate area 40'. In the case where the guide hole portion 40b penetrates through the cladding member 40, the surface of the substrate 30 becomes exposed.

As mentioned above, the guide hole portion 40b is provided in the substrate area 40', thus it is possible to raise the freedom degree in design of the guide hole portion 40b. That is, while enhancing position accuracy of a relative position between optical waveguide hole 40a and the guide hole portion 40b, it is possible to freely change the position in which the guide hole portion 40b is provided.

(Modified Example 2 of Optical Transmission Body)

The substrate 30 may have a substrate 30A further having a substrate hole portion 30b which is concave in the thickness direction, in the part of the substrate 30 in which the substrate area 40' is located, as shown in FIGS. 6(a) and 6(b). In addition, the cross section of the guide hole portion 40b may be located inside the cross section of the substrate hole portion 30b as seen in a cross-sectional view in the direction perpendicular to the thickness direction (the D3-D4 direction) of the substrate 30A.

The cross-sectional area of the substrate hole portion 30b of the substrate 30A is set to be larger than that of the guide hole portion 40b, as shown in FIG. 6(c). The cross-sectional area of the substrate hole portion 30b of the substrate 30A is set to, for example, 2 μm² or more and 1.5 mm² or less.

Since the cross section of the guide hole portion 40b is located inside the cross section of the substrate hole portion 30b, it is possible to make the depth of the guide hole portion 40b deep. In addition, the lateral direction (the D3-D4 direction) of the guide hole portion 40b becomes the substrate hole portion 30b, thus it is possible to support the guide hole portion 40b and suppress the change in the shape of the guide hole portion 40b. Therefore, while enhancing the shape stability of the guide hole portion 40b for long time, it is possible to insert stably a fitting portion 81 of the optical transmission module base 70' and mount the optical transmission body 20 with high accuracy.

(Modified Example 3 of Optical Transmission Body)

The substrate hole portion 30b may penetrate through the substrate 30 in the thickness direction (a D1-D2 direction) as shown in FIG. 7. As described above, when the substrate hole portion 30b penetrates through the substrate 30, the inside of the substrate hole portion 30b is filled with the cladding member 40.

When the cross section of the guide hole portion 40b is located inside the cross section of the substrate hole portion 30b as seen in a cross-sectional view, the guide hole portion 40b may penetrate or may not penetrate. As seen in a cross-sectional view, the cross section of the guide hole portion 30b is located inside the cross section of the substrate hole portion 30b and is located inside the substrate hole portion 30b, thereby further suppressing the change of the shape of the guide hole portion 40b.

(Modified Example 4 of Optical Transmission Body)

In the cladding member 40, as shown in FIG. 8, the area of an opening portion Gh of the guide hole portion 30b may be greater than the area of an opening portion Wh of the optical waveguide hole 40a. The area of the opening portion Gh of the guide hole portion 30b may be set to be, for example, 5% or more with respect to the area of the opening portion Wh of the optical waveguide hole 40a. The area of the opening portion Gh of the guide hole portion 30b is greater than the area of the opening portion Wh of the optical waveguide hole 40a, thus it becomes more difficult for the shape of the guide hole portion 40b to change than the optical waveguide hole 40a at the time of mounting. As a result, it is possible to stably insert the fitting portion 81 of the optical transmission module base 70' and mount the optical transmission body 20 with high accuracy. In addition, it is possible to maintain position accuracy of the optical transmission substrate 20 with respect to the optical transmission module base 70' for long time, thereby raising reliability.

(Modified Example 5 of Optical Transmission Body)

As shown in FIG. 9, the cladding member 40 may have a plurality of optical waveguide holes 40a, and the core member 50 may be located inside each of the plurality of optical waveguide holes 40a. A plurality of the core members 50 are arranged along the first direction (the D3-D4 direction), and each of the core members 50 extends along the thickness direction (the D1-D2 direction). The distance between the core members 50 in the first direction may be, for example, in the range of 62.5 μm or more and 250 μm or less.

Since the plurality of core members 50 are provided in one through hole 30a, it is possible to make the distance between the centers smaller as compared to the case where one core member is provided in one through hole. That is, in the optical transmission body 20 of the present embodiment, the cladding member 40 can be interposed between two optical waveguide holes 40a, thereby making the distance between the centers smaller. Furthermore, as in the present embodiment, when a laminated ceramic substrate is employed as the substrate 30, it is possible to increase an allowable error with respect to the lamination deviation in laminating a plurality of sub-substrates 31.

(Optical Transmission Module)

A schematic configuration of the optical transmission module 70 of the present embodiment is shown in FIG. 10. Also, FIG. 10 shows the state where an optical device is detached, but the optical transmission body 20 and the optical transmission module base 70' are provided.

The optical transmission module base 70' may be configured by only a support substrate 71 having a function to support the optical transmission device 10, otherwise the optical transmission module base 70' may be configured by only an optical waveguide layer 80 having a function to change a traveling direction of light coming from the optical transmission device 10. In the optical waveguide layer 80, the thickness of the thickness direction thereof is set to, for example, 3 μm or more and 20 μm or less. In the present embodiment, it is described the case where the optical transmission body 20 is mounted on the optical transmission module base 70' in which the optical waveguide layer 80 is formed on a support substrate 71.

The optical waveguide layer 80 has the fitting portion 81 which is fitted into the guide hole portion 40b of the optical transmission body 20 in an upper face 80A of the optical waveguide layer 80. The fitting portion 81 is configured by, for example, a convex portion protruding from the upper face 80A of the optical waveguide layer 80. The height of the fitting portion 81 from the upper face 80A may be set to, for example, 0.5 µm or more and 300 µm or less.

The fitting portion 81 may be configured by the same material as that of the optical waveguide layer 80, or different material from that of the optical waveguide layer 80. When the material constituting the fitting portion 81 and the material constituting the optical waveguide layer 80 are the same, as described below, the fitting portion 81 can be formed when the second core member 83 is formed in the optical waveguide layer 80. Therefore, it is possible to suppress increase of manufacturing process and raise the accuracy of the relative position of the fitting portion 81 and the second core member 83.

The fitting portion 81 may have a shape to be fitted to the guide hole portion 40b, and may use substantially the same size and shape as those of the guide hole portion 40b. The guide hole portion 40b is fitted with the fitting portion 81, so that the optical transmission device 10 is positioned to be mounted in a predetermined position of the optical transmission module base 70'.

Hereinafter, each component of the optical transmission module base 70' will be described referring to FIG. 11.

The support substrate 71 may provide electrical connection with the optical transmission device 10 and other electrical devices. As the support substrate 71 providing such an electrical connection, there may be used a build-up substrate which is composed of a base and a build-up layer and has a through conductor. The build-up layer is composed of a resin insulating layer and an electrically conductive layer. Examples of the resin insulating layer include a thermosetting epoxy resin and bismaleimide triazine resin.

The resin insulating layer may have the thickness, for example, in the range of 10 µm or more and 70 µm or less. As the resin insulating layer, it is preferable to use a resin insulating layer through which fine holes can be made with a laser beam. The build-up layer is piled up using the resin insulating layer, thereby turning a complex electric wiring pattern or integrating the complex electric wiring pattern in a small space.

The optical waveguide layer 80 includes a second cladding member 82 and a second core member 83. The second cladding member 82 functions as a base of the optical waveguide layer 80. The second core member 83 is formed inside the second cladding member 82. The optical waveguide layer 80 is disposed such that the second core member 83 is optically connected with the core members 50 of the optical transmission body 20.

The second core member 83 is made to have larger refractive index than the refractive index of the second cladding member 82. Since the refractive index of the second core member 83 is larger as compared with that of the second cladding member 82, it is possible to confine the light signal inside the second core member 83, so that the second core member 83 can function as an optical waveguide 83a. When the refractive index contrast of the second core member 83 relative to the second cladding member 82 is in the range of 0.8% or more and 4% or less, the second core member 83 can transmit an incident light with good efficiency.

The second core member 83 is formed inside the second cladding member 82 and extends along an extension direction thereof. Here, the extension direction is denoted by the D5-D6 direction. Only one or a plurality of second core members 83 may be formed inside the second cladding member 82, or the second core member may be formed corresponding to the number of core member 50. In the present embodiment, the case is described in which only one of the core members 50 of the optical transmission body 20 is provided and only one of the second core members 83 is provided.

As shown in FIG. 11(a), an optical path changing section 83' may be formed in the second core member 83. The optical path changing section 83' is formed in an edge of the optical waveguide 83a. The optical path changing section 83' has a function to change the optical path so as to transmit light along the optical waveguide 83a to the outside of the path, or a function to change the optical path so as to bring light incident from the outside the path inside the optical waveguide 83a. That is, the part of the second core member 83 located on the D5 direction side in the extension direction from the optical path changing section 83' functions as the optical waveguide 83a, but the part of the second core member 83 located on the D6 direction side in the extension direction from the optical path changing section 83' does not function as the optical waveguide 83a.

In the optical waveguide layer 80, the extension direction along which the second core member 83 extends is an optical transmission direction. In terms of the size of the second core member 83, the length of one side or diameter is, for example, in the range of 10 µm or more and 100 µm or less in the planar direction (the D1-D2 direction and the D3-D4 direction) along which the second core member 83 widens in the first direction and the thickness direction.

In the present embodiment, a light reflection face is formed as the optical path changing section 83'. The light reflection face is inclined to an optical axis of the waveguide 82a, and the optical path can be changed by light reflection. Bisected angle between an optical axis direction of the optical waveguide 83a and a direction changing the optical path may be used to obtain an inclination angle of the light reflection face, and the inclination angle is formed, for example, in the range of the bisected angle±3 degrees.

The optical waveguide layer 80 of the present embodiment, as shown in FIG. 11(b), has a cavity 42a formed therein which is recessed from an upper surface. The second cladding member 82 and the second core member 83 are shown in the inner circumferential surface of the cavity 42a. In the present embodiment, the second core member 83 is divided into two by the cavity 42a. In the present embodiment, a part of the second core member 83 shown in the inner surface of the cavity 42a functions as a light reflection face. In the present embodiment, the light reflection face refers to the optical path changing section 83'. The upper face of the optical path changing section 83' may be covered with a reflection film such as a metal.

The cavity 42a functions as an entrance opening for inputting light to the optical waveguide 83a through the light reflection face or an exit opening for taking out the light transmitted along the optical waveguide 83a through the light reflection face. The light reflection face is inclined about 45°, specifically, in the range of 42° to 48° with respect to the extension direction and the thickness direction. As long as the cavity 42a functions as the entrance opening or the exit opening, the cavity 42a may either be shaped as a hollow or be filled with some material.

Examples of a material forming the second cladding member 82 and the second core member 83 include a resin available for a direct exposure process, a resin available for a refractive-index variation process, or the like. Examples of the resin available for the direct exposure process include a resin having a photosensitivity, which includes an epoxy resin, an acryl resin, and a polyimide resin. In addition, examples of the resin available for the refractive-index variation process include a resin having a characteristics in which the refractive index is lowered by irradiation of ultra-violet radiation (UV ray), which includes, for example, a resin such as polysilane.

Here, the direct exposure process is a method for forming the optical transmission layer 80 by forming the lower part of the second cladding member 82, followed by forming the second core member 83 thereon by coating the material of formation of the second core member 83 and exposing it to light with masks, and further coating the material of formation of the second cladding member 82 on the upper and side surfaces of the second core member 83. Moreover, the refractive-index variation process is a method for forming the optical waveguide by performing UV radiation on a region other than the region for forming the second core member 83 to reduce the refractive index of the region other than the region for forming the second core member 83.

(Modified Example 1 of Optical Transmission Module)

Figure 12:
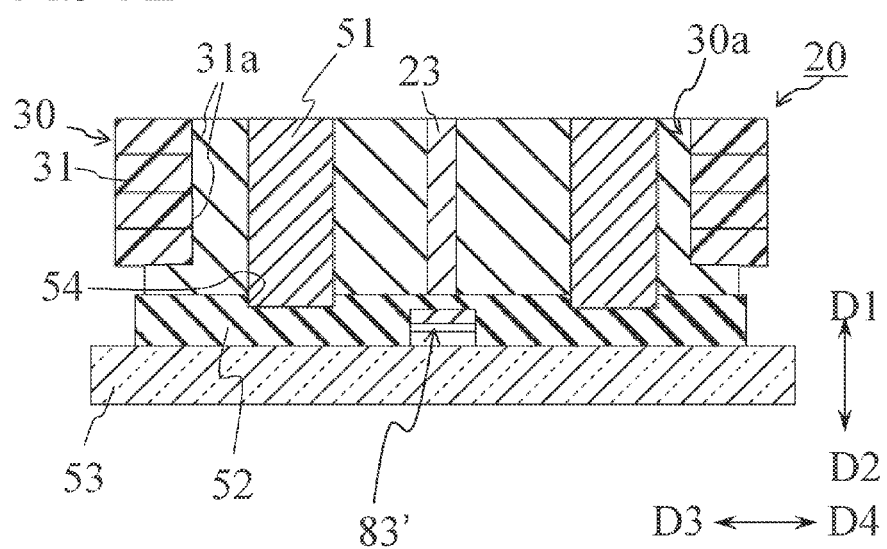
FIG. 12 is a view showing a modified example of the optical transmission module shown in FIG. 10, which corresponds to a cross section taken along the line D-D' in FIG. 10(*a*)

The optical transmission module base 70', as shown in FIG. 12, may have a concave portion 54 which is concave in the thickness direction, and a fitting portion 51 may be located inside the concave portion 54. In this case, for example, a rod-like member (pin) may be used as the fitting portion 51, thereby a material of the fitting portion 51 can be chosen widely. The fitting portion 51 is fitted to the concave portion 54 and the guide hole portion 40b, so that the optical transmission device 10 and the optical transmission module base 70' can be aligned.

(Modified Example 2 of Optical Transmission Module)

In the optical waveguide layer 80 of the optical transmission module base 70', a plurality of waveguide layers 84 having the second cladding member 82 and the second core member 83 may be laminated, and the second core member 83 of each layer may be optically connected.

The optical waveguide layer 80, for example, as shown in FIG. 13, may have a first part 80a extended in the direction perpendicular to the thickness direction, and a second part 80b which extends in the thickness direction, and an upper face 80bA of the second part 80b is located to face the core member 50 of the optical transmission body 20 and a lower face 80bB of the second part 80b abuts on the first part 80a.

Here, the first part 80a of the optical waveguide layer 80 refers to the optical waveguide 83a (the second core member 83 of the optical waveguide 83a) of the optical waveguide layer 80. The second optical waveguide layer 85 is provided on the optical waveguide 83a of the optical waveguide layer 80. The second core member 83 (the second part 80b) of the second optical waveguide layer 85 is located to be optically connected with the optical waveguide 83a. Specifically, the lower face 80bB of the second part 80b is disposed to overlap the optical path changing section 83' of the first part 80a as seen in a plan view.

The second part 80b of the second optical waveguide layer 80 is configured so that the shape of the upper face 80bA and the shape of the lower face 80bB are different from each other. The second part 80b may be configured so that the shape of the upper face 80bA is different from the shape of the lower face 80bB in the second core member 83 which exists in one waveguide layer 84, or may be configured so that the shape of the upper face 80bA is different from the shape of the lower face 80bB by overlapping a plurality of the waveguide layers 84.

In this way, for example, when the cross-sectional shape of the core member 50 of the optical transmission body 20 and the cross-sectional shape of the first part 80a of the optical waveguide layer 80 are different from each other, the cross-sectional shape of the traveling light can be adjusted by the second part 80b. The cross-sectional shape described here refers to the shape of the cross section cut in a direction perpendicular to the direction along which light travels (the traveling direction). As described above, the light coming from the optical transmission body 20 whose cross-sectional shape is adjusted by the second part 80b, is inputted from the core member 50 to the first part 80a, thereby lowering the connection loss in inputting the light to the first part 80a.

The width of the upper face 80bA of the second part 80b may be larger than the width of the lower face 80bB of the second part 80b. The width of the upper face 80bA and the width of the lower face 80bB may be determined based on the width of the core member 50 and the width of the second core member 83, respectively. The cross-sectional area of the second part 80b is set to become small as light travels, thereby lowering the connection loss of the light traveling from the optical transmission body 20 to the optical waveguide layer 80.

The width of the upper face 80bA of the second part 80b may be larger than the width of the core member 50. Therefore, it is possible to input light coming from the core member 50 to the upper face 80bA of the second part 80b in the state of a low connection loss. Further, the width of the lower face 80bB of the second part 80b may be set such that the whole lower faces 80bB abut on the first part 80a. Therefore, it is possible to lower the connection loss of light incident from the second part 80b into the first part 80a.

The second part 80b may have a polygon shape in which the upper face 80bA has more corners than the lower face 80bB. Here, the upper face 80bA has a polygon shape having more corners than the lower face 80bB, thus, for example, in the case where the lower face 80bB has a square shape, a polygon shape whose number of corners is equal to or greater than five, can be used as a shape of the upper face 80bA. In the case where a circle shape is used as the shape of the core member 50 of the optical transmission body 20, the polygonal shape having a large number of corners is close to the circle shape, thereby lowering the connection loss of light coming from the core member 50. In addition, in the second part 80b, the upper face 80b may have the circle shape. In the case where the core member 50 of the optical transmission body 20 is formed to have a circle shape, it is possible to further lower connection loss of light.

The second part 80b, as shown in FIG. 13, may be configured by a plurality of the waveguide layers 84. That is, the second part 80b may be configured by making the shape of each of the second core members 83 of the laminated waveguide layers 84 different. In the present embodiment, it will be described the case where, in the optical waveguide layer 80, three waveguide layers 84 are laminated. In addition, in the present embodiment, between the support substrate 71 and the waveguide layer 84, the waveguide layer as well as the second cladding member 82 are provided. Also, it will be described the case where the cross section shape of the core member 50 is formed to have a circle shape and the cross section shape of the optical waveguide 83a is formed to have a square shape.

As shown in FIG. 13a, the second part 80b is located such that the upper face 80bA faces the core member 50 of the optical transmission body 20. Also, as shown in FIGS. 13(b) and 13(c), the second part 80b is disposed such that the lower face 80bB has an overlapped part with the optical path changing section 83' of the optical waveguide 83a as seen in a plan view. The second part 80b is configured by three conductive layers 84. Here, the second core member 83 of each conductive layer 84 is referred to as second core members $83b_1$, $83b_2$ and $83b_3$ from the side close to the optical transmission body 20. In the present embodiment, a circle shape, a hexagon shape, and a square shape are used as the shape of the second core members $83b_1$, $83b_2$ and $83b_3$, respectively. As the second part 80b is configured as mentioned above, when the light coming from the core member 50 of the optical transmission body 20 is inputted to the optical waveguide 83a, it is possible to lower connection loss.

(Modified Example 2 of Optical Transmission Module)

Figure 14:
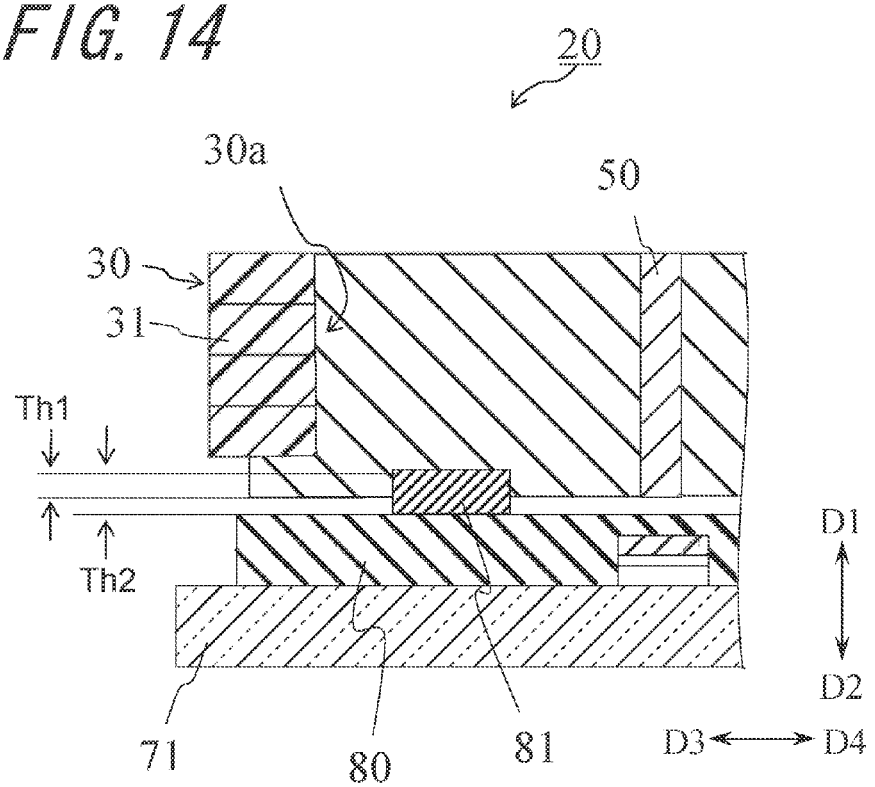
FIG. 14 is a view showing a modified example of the optical transmission module shown in FIG. 10, which corresponds to a cross-sectional view taken along the line D-D' in FIG. 10(a)

A depth size Th1 of the guide hole portion 40b, as shown in FIG. 14, may be smaller than a height size Th2 of the fitting portion 81. Due to this, it is possible to form a gap between the optical transmission body 20 and the optical waveguide layer 80 of the optical transmission module base 70'. Therefore, it is possible to easily adjust the gap between the optical transmission body 20 and the optical waveguide layer 80, by adjusting the depth size Th1 of the guide hole portion 40b and the height size Th2 of the fitting portion 81. In addition, the optical transmission body 20 can be mounted on the optical transmission module base 70' by making the depth size Th1 of the guide hole portion 40b bigger than the height size Th2 of the fitting portion 81.

<Method for Manufacturing Optical Transmission Body>

Hereinafter, a method of manufacturing the optical transmission body 20 is described as an example of a method of manufacturing the optical transmission body of the present embodiment referring to figures.

First, the substrate 30 having the through hole 30a penetrating therethrough in the thickness direction (the D1-D2 direction) is prepared. The substrate 30 of the present embodiment is manufactured by the processes as follows. Firstly, as shown in FIG. 15(a), a plurality of green sheets 31X for forming the sub-substrate 31 by firing are prepared. Next, as shown in FIG. 15(b), sheet holes 31Xa for forming the sub-through hole 31a are formed in the green sheets 31Xa. Along with formation of the sheet holes 31Xa, a through hole used in a through conductor of the electric wiring 60 is formed as necessary. These holes can be formed using various methods, for example, by punching the sheet with a pin and a die, or by cutting the sheet with a laser beam. Next, a metal paste as the electric wiring 60 is disposed in the green sheet 31X.

The metal paste can be formed using, for example, a screen printing technology or an ink jet printing technology. As the metal paste for forming the electric wiring 60, for example, a metal paste containing a metal such as tungsten (W), molybdenum (Mo), manganese (Mn), silver (Ag) and copper (Cu) can be used. Next, as shown in FIG. 15(c), the green sheets 31X are laminated such that the sheet holes 31Xa are arranged in a row. Then, by firing the laminated green sheets 31X, as shown in FIG. 15(d), the substrate 30 having the through hole 30a is formed. By firing the metal paste along with baking the green sheet 31X, the electric wiring 60 is formed.

Next, as shown in FIG. 16(a), the through hole 30a of the substrate 30 is filled with a photosensitive material 40X formed to be the cladding member 40 by curing. Examples of the photosensitive material 40X include a photosensitive material using an epoxy resin, an acrylic resin and a polyimide resin as a base material. In the present embodiment, a negative photoresist whose solubility with respect to a developing agent decreases by being exposed is employed.

Then, after the photosensitive material 40X is heated (pre-baked), as shown in FIG. 16(b), the pre-baked photosensitive material 40X is exposed. In the time of exposure, there is used a light-transmitting plate 45 such as a photomask having a plurality of light shielding portions for shielding light in order not to irradiate an area formed as the optical waveguide hole 40a with light Lh.

The light-transmitting plate 45, specifically, has a first shielding portion 45a overlapping a portion of the through hole 30a and a second shielding portion 45b positioned away from the first shielding portion 45a. The first shielding portion 45a and the second shielding portion 45b may be disposed corresponding to the optical waveguide hole 40a and the guide hole portion 40b, respectively. A thickness and a material of the first shielding portion 45a and the second shielding portion 45b can be properly selected, and transmittance may be set such that the light Lh is difficult to be transmitted, for example, 0.5% or more and 20% or less.

By applying light to the pre-baked photosensitive material 40X through such a light-transmitting plate 45, parts other than an area in which the first shielding portion 45a and the second shielding portion 45b of the photosensitive filling material 40X overlap each other are exposed. Due to this, the photosensitive material 40X changes to a cladding member having an unexposed portion corresponding to the first shielding portion 45a and the second shielding portion 45b.

Examples of a light source in the time of exposure include various lamps, a laser and an electronic ray. The light source may be selected based on the characteristics of the material of the photosensitive material 40X. By using parallel light (light parallel with the thickness direction of the substrate 30) as the light Lh passing through the light-transmitting plate 45, it enables to make difficult to diffract by the shielding portions, and form unexposed portions for forming the optical waveguide hole 40a and the guide hole portions 40b with good accuracy.

Next, the exposed photosensitive material 40X is heated (post-baked). After the post-baked photosensitive material 40X is developed with the developing agent and the exposed photosensitive material 40X is changed into the cladding member 40, as shown in FIG. 17(a), the cladding member 40 having the optical waveguide hole 40a and the guide hole portions 40b is formed. By eliminating the exposed photosensitive material 40X (photosensitive material 40X of the unexposed portion) other than the part changed into the cladding member 40, the optical waveguide hole 40a penetrating in the thickness direction and the guide hole portions 40b recessed in the thickness direction can be formed in the cladding member 40. Also, the optical waveguide hole 40a and the guide hole portion 45b are formed in the places corresponding to the first shielding portion 45a and the second shielding portion 45b, respectively.

Next, a light-transmitting material for forming a core member 50 is charged into the optical waveguide hole 40a of the cladding member 40. After that, the charged light-transmitting material is cured by means of application of light having a predetermined wavelength, baking, or otherwise, thereby forming the core member 50 as shown in FIG. 17(b).

Upon completion of the procedure thus far described, the optical transmission body 20 shown in FIG. 17(b) is produced.

(Modified Example 1 of Method for Manufacturing Optical Transmission Body)

After a process of filling the optical waveguide hole 40a with a photosensitive material for forming the core member 50, the lower face (the face on the side facing the optical transmission module) of an optical transmission substrate 20 may be polished and flattened. If there is a part of a light-transmitting material for forming the core member protruding from a main surface 20' of the optical transmission substrate 20 after the core member 50 is formed inside the optical waveguide hole 40a, it is possible to mount the optical transmission substrate 20 on the optical transmission module base 70' by flattening the main surface 20' of the optical transmission substrate 20 even in that case. For example, a chemical mechanical polishing method can be used as a method of polishing the lower face of the optical transmission substrate 20.

The invention is not limited to the above embodiment, but rather it is evident that various changes may be made without departing from the scope of the invention.

Though the negative photoresist is used in the above described method of manufacturing the optical transmission body 20, a positive photoresist of which solubility increase in a developing agent by exposure may be employed. In the case of using the positive photoresist, an area to be exposed will be changed.

Though a manufacturing method using a ceramic substrate as the substrate 30 is described in the above as a method of manufacturing the optical transmission body 20, an organic substrate may be used to manufacture the optical transmission body. When the organic substrate is used to manufacture the optical transmission body, a through hole may be formed in the substrate by punching the base after the sub-substrates are laminated. As mentioned above, in the case where the sub-substrates are punched at the same time, it is possible to reduce the position deviation of the sub-substrates.

The invention claimed is:

1. An optical transmission body, comprising:
    a substrate comprising a through hole penetrating there through in a thickness direction thereof;
    a cladding member which is located only within an area defining the through hole as seen in the thickness direction of the substrate, at least a part of the cladding member being positioned to be filled in the through hole, the cladding member comprising an optical waveguide hole which is positioned inside the through hole and penetrates through the cladding member in a thickness direction thereof and a guide hole portion which is positioned away from the optical waveguide hole and is concave in the thickness direction; and
    a core member disposed inside the optical waveguide hole.

2. The optical transmission body according to claim 1, wherein the guide hole portion penetrates through the cladding member in the thickness direction.

3. The optical transmission body according to claim 1, wherein in the cladding member, an opening portion of the guide hole portion has an area larger than an opening portion of the optical waveguide hole.

4. The optical transmission body according to claim 1, wherein the cladding member comprises a plurality of the optical waveguide holes, and the core member is located inside each of the plurality of the optical waveguide holes.

5. An optical transmission body comprising:
    a substrate comprising a first main surface, a second main surface, and a through hole penetrating from the first main surface to the second main surface in a thickness direction of the substrate;
    a cladding member comprising a first area which is positioned to be filled in the through hole and comprises an optical waveguide hole which penetrates through the cladding member in a thickness direction thereof; and
    a core member disposed inside the optical waveguide hole,
    the cladding member further comprising a second area which extends across the second main surface of the substrate from the through hole to overlap the substrate, the second area comprising a guide hole portion penetrating through the cladding member in the thickness direction thereof,
    the guide hole portion being defined only by the cladding member.

6. The optical transmission body according to claim 5, wherein the substrate further comprises a substrate hole portion which is concave in the thickness direction, in a part of the substrate which overlaps the cladding member, and
    wherein a cross section of the guide hole portion is located inside a cross section of the substrate hole portion as seen in a cross-sectional view.

7. The optical transmission body according to claim 6, wherein the substrate hole portion penetrates through the substrate in the thickness direction.

8. An optical transmission module comprising:
    an optical transmission body, comprising:
        a substrate comprising a through hole penetrating there through in a thickness direction thereof;
        a cladding member at least a part of which is positioned to be filled in the through hole, the cladding member comprising an optical waveguide hole which is positioned inside the through hole and penetrates through the cladding member in a thickness direction thereof and a guide hole portion which is positioned away from the optical waveguide hole and is concave in the thickness direction; and
        a core member disposed inside the optical waveguide hole; and
    an optical transmission module base on which the optical transmission body is mounted, and which comprises a fitting portion fitted with the guide hole portion,
        wherein the optical transmission module base comprises a plurality of layers laminated, each of which comprises a second cladding member and a second core member, and comprises an optical waveguide layer which is optically connected with the second core member,
        wherein the optical waveguide layer comprises a first part extended in a direction perpendicular to the thickness direction and a second part which extends in the thickness direction, and of which an upper face is located to face the core member of the optical transmission body and a lower face abuts on the first part, and
        wherein in the second part, a shape of the upper face and a shape of the lower face are different from each other.

9. The optical transmission module according to claim 8, wherein the optical transmission module base comprises a concave portion which is concave in the thickness direction, and the fitting portion is located inside the concave portion.

10. The optical transmission module according to claim 8, wherein a width of the upper face of the second part is larger than that of the lower face of the second part.

11. The optical transmission module according to claim 8, wherein the shape of the upper face of the second part is of polygon having a larger number of corners than a number of corners of the lower face of the second part.

12. The optical transmission module according to claim 8, wherein the shape of the upper face of the second part is a circle shape.

13. The optical transmission module according to claim 8, wherein the guide hole portion has a depth dimension smaller than the fitting portion.

14. A method of manufacturing an optical transmission body, comprising:
- preparing a substrate comprising a through hole penetrating there through in a thickness direction thereof;
- filling an inside of the through hole with a photosensitive material;
- changing the photosensitive material into a cladding member comprising an unexposed portion corresponding to a first shielding portion and a second shielding portion, by exposing parts other than an area in which the first shielding portion and the second shielding portion overlap each other out of the photosensitive filling material, to light through a light-transmitting plate comprising the first shielding portion overlapping the through hole and the second shielding portion positioned away from the first shielding portion;
- forming in the cladding member an optical waveguide hole penetrating in the thickness direction in correspondence with the first shielding portion and a guide hole portion which is concave in the thickness direction in correspondence with the second shielding portion by eliminating the photosensitive material on an unexposed portion; and
- filling an inside of the optical waveguide hole with a light-transmitting core member having a refractive index higher than a refractive index of the cladding member.

\* \* \* \* \*